Feb. 25, 1936.  H. GALLUSSER  2,031,704
AUTOMATIC SLACK ADJUSTER
Filed Jan. 10, 1934  2 Sheets-Sheet 1
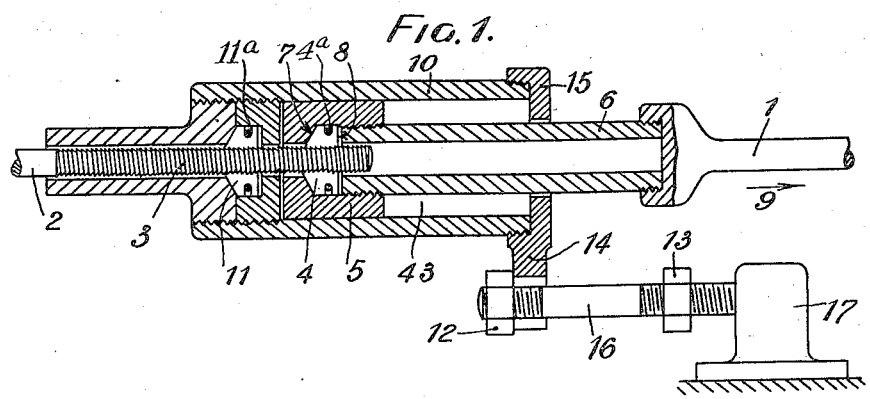
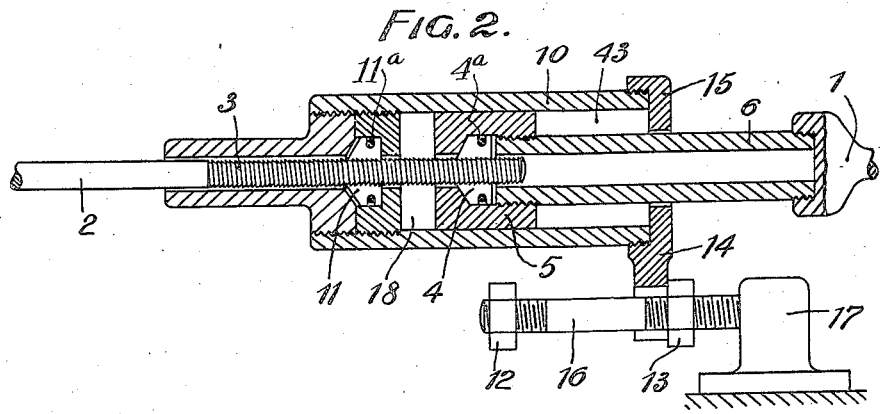
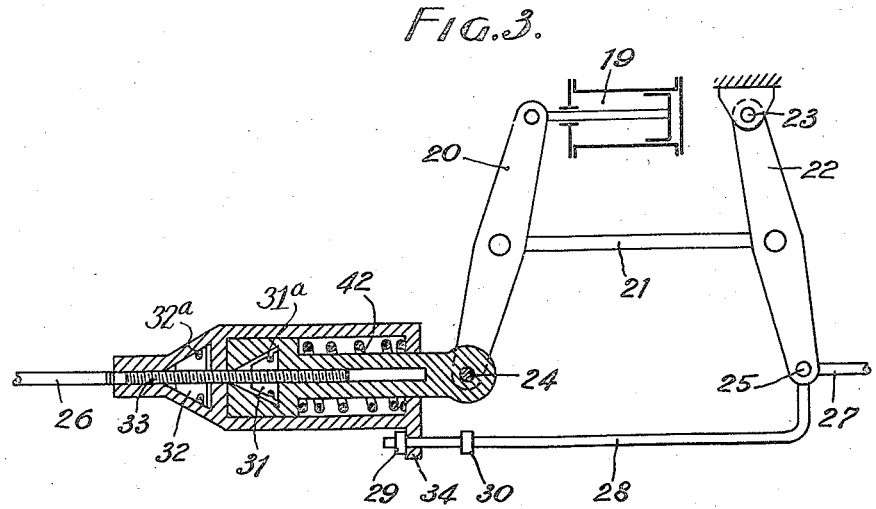
Inventor:
Hans Gallusser
by Lotka & Kehlenbeck
Attorneys.

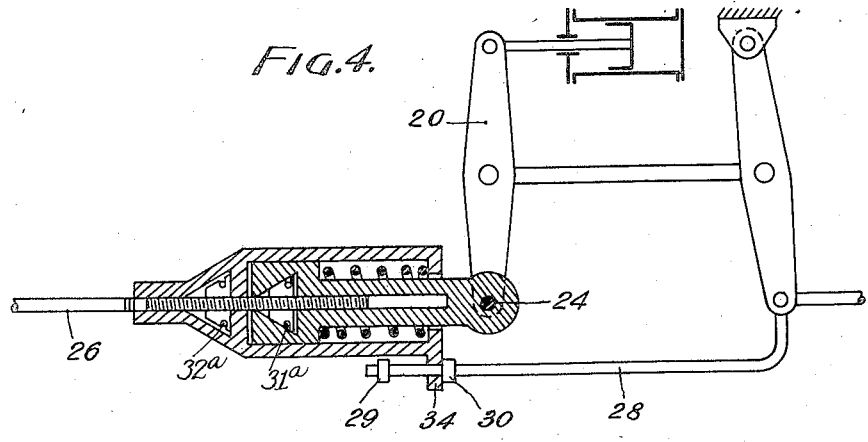
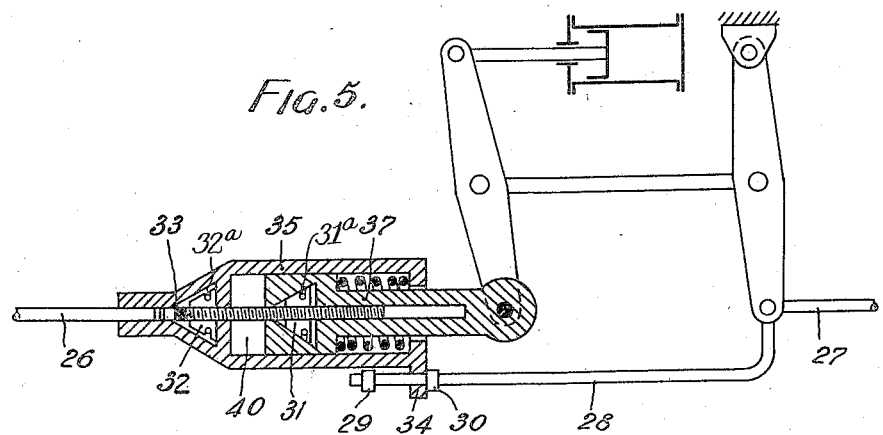
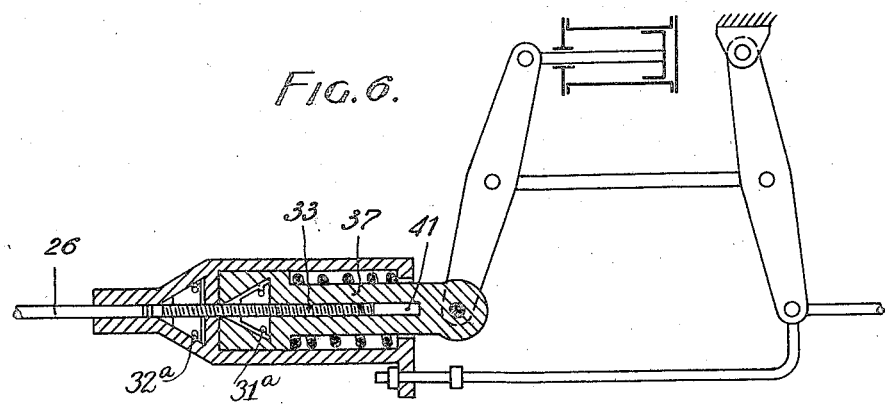

Patented Feb. 25, 1936

2,031,704

UNITED STATES PATENT OFFICE 2,031,704

AUTOMATIC SLACK ADJUSTER

Hans Gallusser, Geneva, Switzerland

Application January 10, 1934, Serial No. 705,992
In Switzerland January 16, 1933

1 Claim. (Cl. 188—200)

Different devices for the automatic taking up of the play occasioned by the wear and tear of the brake-shoes or bands, the lengthening of the members of the brake rigging mechanism, etc., are already known.

The invention relates to such a device which is composed of pawls formed by clamps located on a threaded bar of the brake rigging mechanism, each of these clamps consisting of a nut divided in several parts held together by an elastic member, the nut having an exterior conical surface which by the action of tractive effort, effects the coupling of the threaded bar with the members with which it is intended to cooperate, each clamp being capable of moving between two abutments, one of which is conical, the distance between the abutments of each clamp being just sufficient for the disengaging of the clamp from the threads of the bar bearing the clamp.

The device according to the invention comprises two clamps, the pair of abutments of one clamp being rigidly connected to the member of the brake rigging with which the threaded bar co-operates, whilst the pair of abutments of the other clamp are connected to a movable member between two adjustable abutments, located outside the device, the two members, each of which bears one of the pairs of the abutments of a clamp, being co-axial and capable of meeting each other so as to push each other along.

The drawings show, by way of example two forms of the device embodying the invention.

Figs. 1 and 2 show cross sectional views of a device capable of being fitted to the simple bar of a brake rigging mechanism, with the parts in two different positions.

Figs. 3 to 6 show another form of the invention applicable particularly to the Westinghouse railway vehicle type of brake, with the parts in different positions.

According to the form illustrated in Figs. 1 and 2, the bar 1 is intended to transmit a tractive effort to the bar 2 threaded at 3 and connected to the brake members for effecting the braking action, said brake members not being illustrated in the drawings. The tractive effort developed by the bar 1 is transmitted to the bar 2 by means of the clamp 4 of the casing or box 5 which contains it, and by means of the tube 6 which is connected to said box 5 and into which the bar 2, which is co-axial with said tube 6, can enter.

The clamp 4 is movable between two abutments, one of which is conical as indicated at 7 and the other flat as indicated at 8; it is easily seen, because of the form of the clamp and the direction of the saw-tooth threads 3 that if a tractive effort is exerted in the direction of the arrow 9 on the bar 1, the bar 2 will be drawn along by the tightening of the different parts of the clamp 4 by the action of the conical abutment 7 thereon.

Surrounding the aforesaid members is a casing or cylinder 10 containing a second clamp 11 capable of being displaced with said members, at least within certain limits determined by the abutment-nuts 12, 13, between which the setting member or arm 14 carried by the cylinder moves. The clamp 11, facing in the same direction as the clamp 4 is also movable between two abutments, one of which is conical and the other flat. The abutment-nuts 12 and 13 are disposed on a rod 16 comprising correspondingly threaded parts, and fixed in a stationary lug 17 suitably mounted on the chassis of the vehicle.

This is what takes place when the braking action is applied:

A tractive effort is exerted in the direction of the arrow 9 on the bar 1, which is transmitted as above described to the clamp 4 and thence, to the bar 2, the latter transmitting it to the braking members, e. g. to the brake shoes. Bar 1, bar 2, tube 6, box 5 and clamp 4 are therefore displaced to the right in the drawings, and correspondingly pull the clamp 11 and the members surrounding it, particularly the cylinder 10, its bottom 15 and the arm 14 which, leaving its contact with the abutment-nut 12, will slide along the rod 16 at least as far as the space between the abutment-nuts 12 and 13 will allow.

This space between these two nuts must normally be adjusted in such a way that the displacement it allows will be sufficient for a perfect braking action.

Should the braking action, this adjustment being effected, necessitate a greater displacement because of wear and tear on the brake shoes, the different members of the device would reach the positions shown in Fig. 2.

In this figure, it will be noted, that the arm 14 by engagement with the abutment-nut 13, and the rod 1 continuing with the rod 2 its braking movement has effected a separation between the box 5 of the clamp 4 and the adjacent members surrounding the clamp 11. The space 18 thus formed results from the excess of play in the brake shoes and determines a length, and this is the length by which the bar 2 must be shortened for the purpose of overcoming the said play.

It is to be noted that if the clamp 11 has been stopped in its movement, and the bar 2 has been able to continue its displacement, this is due to the inclined direction of the saw-tooth form of the threads 3 and to the fact that the clamp 11 through this operation, has been applied against the flat abutment, so that the segments which form it are free to move away from one another and to thus permit the said bar to move relatively.

The braking action being over, when the bar 1 returns to its original position, the entire device will be displaced in the same direction, i. e. from right to left in the drawing, and this displacement will continue until the arm 14 meets the abutment-nut 12. At that moment, the bar 1 will continue its course until the box 5 again engages the members surrounding the clamp 11, thus eliminating the space 18. But the bar 2 will not be able to join in this latter part of the movement, because it is held back by the clamp 11 which does not allow this bar to move from right to left and is at this moment itself held back by the members surrounding it, the cylinder 10, the bottom 15 and the arm 14 in contact with the abutment-nut 12. The clamp 4 on the other hand, because of its direction and the direction of the saw-tooth threads 3 will allow for this moving together of the clamps 4 and 11 by jumping from thread to thread on the bar 2.

It is now clear that at the next braking action, when the bar 1 again draws along the bar 2, the whole length of these two bars will be shortened by the space 18 i. e. by the excess of play to be taken up, these operations being repeated every time a taking up action is required.

The fact that the abutments 12 and 13 consist of nuts disposed on a threaded bar, allows the position of these abutments in relation to the extreme positions of a normal braking action to be adjusted exactly.

The Westinghouse brake according to Figs. 3 to 6 comprises a brake cylinder 19 the piston-rod of which acts on a double-lever 20 pivotally movable on the end of a bar 21, the other end of which is articulated with a double lever 22 similar to the preceding one, pivotally fixed at 23, the two ends 24, 25 of the two double levers acting in the well known way on the braking members.

One of the braking bars 26 is connected to lever 20 at the pivot 24 by means of a device according to the invention, whilst the other bar 27 is connected to the lever 22 as usual at the pivot 25. A bar 28 carrying the two abutment-nuts 29, 30 is also connected to the lever 22 at the pivot 25.

Fig. 3 shows the members out of action with the clamps 31, 32 occupying the nearest possible position to each other on the threaded part 33 of the bar 26.

Fig. 4 shows the displacement of these different members at the time of a normal braking action i. e. when the brake shoes develop no excess of play: the setting member or arm 34 of the device has moved away from the abutment-nut 29 and is now applied against the abutment-nut 30, the space between these two nuts being so determined as to allow a correct braking action. Moreover as can be seen, the whole device has been displaced from left to right in the drawings, following in its movement the bar 26 as well as the pivot 24 of the lever 20, whilst the bar 28 with its abutments will have been displaced in a contrary direction, so that in reality a relative movement has taken place between the arm 34 and the abutments 29, 30. The adjustment of the abutments must therefore be effected in accordance with this relative displacement.

If now, owing to an excess of play of the brake shoes, the braking action is not perfect, the different members will continue their movement, with the exception that the exterior cylinder or box 35 of the device will be held back by means of its setting member or arm 34 applied against the abutment-nut 30, this box in its course correspondingly holding back the clamp 32 through which the threads 33 of the bar 26 will now slide. In the manner set forth above, a relative displacement will accordingly take place between the box 35, pushed to the left in the drawings by the bar 28, and the interior tube or box 37 of the clamp 31 adjusted relatively to the right, the space 40 occuring now between the exterior box and the interior box in the axial direction, being at this moment an indication of the excess of the total play, not only of the shoes controlled by the bar 26 but also of these controlled by the bar 27.

The braking action over, only a return relative movement, equivalent to a normal braking action, can of course take place between the device and the abutments 29, 30, after which the exterior box 35 of the device will be blocked by the abutment 29, and only the interior box 37 will continue its return movement as described in regard to the first form of the invention, by shortening the bar 26, by a length corresponding to the width of the space 40. It is this last final position that is shown in Fig. 6, in which the threaded part 33 is seen to enter more deeply into the cylindrical bore 41 of the box 37.

The return of the various members to the inoperative position may be effected by springs outside the device, but may also as shown in this second form of the invention, be effected by an interior spring 42.

Moreover if desired such a spring may be placed in the first form of the device, in the ring-shaped space 43 of Figs. 1 and 2.

As shown in the drawings the clamps 4, 11, 31 and 32 consist of co-operating parts or sections yieldingly held together by means of elastic members 4a, 11a, 31a and 32a respectively.

What I claim is:

In an automatic play take-up device for brake rigging, the combination of an outer casing, an inner casing telescopically combined with said outer casing, a conical stop on each of said casings, a flat stop on each of said casings in opposed spaced relation to the conical stop thereof, a threaded bar projecting into said casings and constituting part of the brake rigging, clamps located within said casings in operative relation to said threaded bar, said clamps each consisting of a plurality of sections held together by an elastic member and being movable between the stops of the respective casings and co-operating therewith to respectively grip and release said thread bar, a pair of double levers constituting part of the brake rigging, one of said casings being connected with one of said levers, two spaced abutments carried by the other of said levers, and a setting member carried by the other casing and movable between said spaced abutments, said setting member in co-operation with said pair of abutments being arranged to shift said casings relatively to each other to adjust said clamps relatively to said threaded bar to automatically take up play in said brake rigging.

HANS GALLUSSER.